(12) United States Patent
Hisano et al.

(10) Patent No.: US 6,506,264 B1
(45) Date of Patent: Jan. 14, 2003

(54) FERROMAGNETIC POWDER

(75) Inventors: Seiichi Hisano, Chiba; Kazuhisa Saito, Okayama; Kazushi Sano, Okayama; Akio Sawabe, Okayama; Akito Inoue, Funabashi; Kenichi Inoue, Okayama, all of (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 09/601,942

(22) PCT Filed: Dec. 18, 1998

(86) PCT No.: PCT/JP98/05748

§ 371 (c)(1),
(2), (4) Date: Aug. 10, 2000

(87) PCT Pub. No.: WO00/38201

PCT Pub. Date: Jun. 29, 2000

(51) Int. Cl.$^7$ ............................................. H01F 1/055
(52) U.S. Cl. ......................................... 148/301; 420/83
(58) Field of Search ................................ 148/301, 306, 148/311, 315; 420/83, 77, 80, 103; 428/694 RE, 694 BR, 694 BH

(56) References Cited

U.S. PATENT DOCUMENTS

| 5,496,622 A | | 3/1996 | Isobe et al. ................. 428/216 |
| 5,535,361 A | * | 7/1996 | Hisano et al. ......... 428/694 RE |
| 5,580,399 A | * | 12/1996 | Tanai et al. .................. 148/301 |
| 5,591,535 A | * | 1/1997 | Hisano et al. ......... 428/694 RE |
| 5,637,390 A | | 6/1997 | Isobe et al. .................. 428/323 |
| 5,645,652 A | * | 7/1997 | Okinaka et al. ............. 148/307 |
| 5,698,311 A | * | 12/1997 | Masaki et al. ............... 428/328 |

FOREIGN PATENT DOCUMENTS

| EP | 0 827 137 | | 3/1998 |
| JP | 6-36265 | | 2/1994 |
| JP | 6-163232 | | 6/1994 |
| JP | 7-22224 | * | 1/1995 |
| JP | 7-126704 | | 5/1995 |
| JP | 7-179913 | | 7/1995 |
| JP | 7-74365 | | 8/1995 |
| JP | 7-331310 | | 12/1995 |
| JP | 8-181008 | | 7/1996 |
| JP | 10-69629 | | 3/1998 |

* cited by examiner

Primary Examiner—John Sheehan
(74) Attorney, Agent, or Firm—McDermott, Will & Emery

(57) ABSTRACT

A ferromagnetic powder containing iron as the principal component and containing more than 5 to 50 at. % Co, 0.1 to 30 at. % Al, 0.1 to 10 at. % of a rare earth element inclusive of Y, 0.05% by weight or less of an element belonging to Group 1a of the Periodic Table, and 0.1% by weight or less (inclusive of 0% by weight) of an element belonging to Group 2a of the Periodic Table, the powder comprising flat acicular particles having a mean major axis length of 0.01 to 0.40 μm and a crystallite diameter as determined by X-ray diffraction (Dx) of 50 to 250 angstrom, provided that the cross section diameter in the minor axis direction cut perpendicular to the major axis has a larger width and a smaller width, and that this cross section ratio in the minor axis direction, which is a larger width to smaller width ratio, uniformly yields a value of greater than 1, preferably 1.5 or higher, and the powder yielding a $\sigma_s/Dx$ ratio of 0.7 or higher, wherein, $\sigma_s$ represents the saturation magnetization and Dx represents the crystallite size determined by X-ray diffraction.

6 Claims, 5 Drawing Sheets

FERROMAGNETIC POWDER

TECHNICAL FIELD

The present invention relates to a ferromagnetic powder suitable for use in forming a magnetic layer of a coating type magnetic recording medium such as a magnetic tape and a magnetic disk.

BACKGROUND OF THE INVENTION

In a so-called coating type magnetic recording medium comprising a magnetic layer formed on a support by applying a coating film of a magnetic powder dispersed in a binder resin, there are demands for a still higher recording density. To cope with this requirement, ferromagnetic powders consisting of finer particles are being used, and with decreasing the size of the particles, improvements have been made in the electromagnetic conversion properties such as the output, the C/N ratio, frequency characteristics, etc. For instance, in Japanese Patent.

Publication JPA-Hei-6-36265 (Nos. 36265/1994), JPA-Hei-6-163232 (Nos. 163232/1994), JPA-Hei-7-331310 (Nos. 331310/1995), JPB-Hei-7-74365 (Nos. 74365/1995), JPA-Hei-7-126704 (Nos. 126704/1995), JPA-Hei-7-179913 (Nos. 179913/1995) and JPA-Hei-8-181008 (Nos. 181008-1996) are proposed various types of ferromagnetic powder which constitute the magnetic layer of the coating type magnetic recording medium. These disclosures also show the magnetic properties as well as the powder characteristics of the ferromagnetic powders.

Furthermore, it is desired to make the magnetic layers thinner to obtain high output characteristics while minimizing noise. To achieve this requirement, there is proposed a coating type magnetic recording medium having a multi-layer structure, in which a non-magnetic layer is provided as a coating film of a non-magnetic powder dispersed in a binder resin, between the magnetic layers and the support. For instance, in U.S. Pat. Nos. 5,496,622 and 5,637,390 is disclosed a magnetic recording medium having the multi-layer structure, and as a magnetic powder for forming the magnetic layer, there is described the use of fine acicular metallic powder of iron containing Co, a rare earth element, Al, Si, etc.

OBJECT OF THE INVENTION

In obtaining a magnetic recording medium increased in density by using a fine-grained magnetic powder, regardless of whether it has a multilayer structure or not, the following problems were found to be overcome:

(1) The saturation magnetization decreases with reducing size of the particles, thereby leading to a magnetic recording medium having low output and a low C/N ratio;

(2) The coercive force similarly decreases with reducing size of the particles, thereby leading to a magnetic recording medium having low output and a low C/N ratio;

(3) The desired particle shape cannot be maintained with reducing size of the particles, thereby leading to a magnetic recording medium having low C/N ratio due to the particles deformed in shape or round particles, or to the presence of pores in the particles; and (4) The weather resistance tends to be impaired with increasing saturation magnetization.

DISCLOSURE OF THE INVENTION

According to an aspect of the present invention, there is provided a ferromagnetic powder containing iron as the principal component and containing more than 5 to 50 at. % Co, 0.1 to 30 at. % Al, 0.1 to 10 at. % of a rare earth element inclusive of Y, 0.05% by weight or less of an element belonging to Group 1a of the Periodic Table, and 0.1% by weight or less (inclusive of 0% by weight) of an element belonging to Group 2a of the Periodic Table, said powder comprising flat acicular particles having a mean major axis length of 0.01 to 0.40 μm and a crystallite diameter as determined by X-ray diffraction (Dx) of 50 to 250 angstrom, provided that the cross section diameter in the minor axis direction cut perpendicular to the major axis has a larger width and a smaller width, and that this cross section ratio in the minor axis direction, which is a larger width to smaller width ratio, uniformly yields a value of greater than 1, preferably, a value of 1.5 or higher, and said powder yielding a $\sigma_s/D_x$ ratio of 0.7 or higher, wherein, $\sigma_s$ represents the saturation magnetization and Dx represents the crystallite size determined by X-ray diffraction.

The ferromagnetic powder according to the present invention preferably releases $H_2O$ at 100° C. at an amount of 2% by weight or less, and releases $H_2O$ released at 300° C. at an amount of 4% by weight or less; it preferably has a true density thereof is 5.55 g/cm³ or higher and the specific surface area as determined by BET method is in a range of from 30 to 70 m²/g; it preferably yields a saturation magnetization ($\sigma_s$) in a range of from 100 to 200 emu/g and a coercive force in a range of from 1,200 to 3,000 Oe; and it has a decrease in saturation magnetization ($\sigma_s$) of 15% or lower when left under an atmosphere with a relative humidity of 90% at 60° C. for one week.

PREFERRED EMBODIMENT OF THE INVENTION

Figure 1:
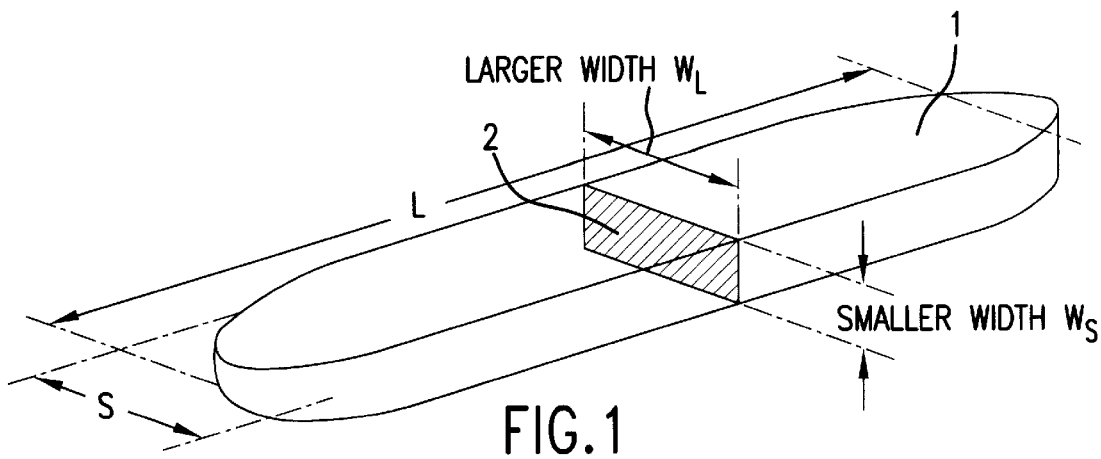
FIG. 1 shows a schematic drawing of a particle provided as an explanatory means to describe the figure of the flat acicular particles according to the present invention.

The ferromagnetic powder in accordance of the present invention for use in a coating type magnetic recording medium is a Fe-based metallic powder consisting of acicular particles, and because it has a specified requirement upon the components and the size and figure of the particles, it enables a magnetic layer suitable for high density recording. More specifically, the powder is specified by the size and figure characteristics in that it comprises flat acicular particles having a mean major axis length of 0.01 to 0.40 μm, combined with the specified composition. Thus, the powder according to the present invention having well balanced a shape retainable property and magnetic characteristics enables the production of a magnetic recording medium having high performance never achieved by the conventional products. The content of the components as well as the size and figure characteristics of the particles constituting the metallic magnetic powder according to the present invention are described below.

Content of the Components

The metallic magnetic powder according to the present invention comprises flat acicular (the term "flat acicular" is described in further detail hereinafter) ferromagnetic particles containing more than 5 to 50 at. % Co, 0.1 to 30 at. % Al, 0.1 to 10 at. % of a rare earth element inclusive of Y, 0.05% by weight or less of an element belonging to Group 1a of the Periodic Table, 0.1% by weight or less (inclusive of 0% by weight) of an element belonging to Group 2a of the Periodic Table, and balance substantially iron. Furthermore, the ferromagnetic powder preferably releases $H_2O$ at 100° C. at an amount of 2% by weight or less, and releases $H_2O$ released at 300° C. at an amount of 4% by weight or less.

The reason for limiting the content of each of the components above is described below. Cobalt contributes to the improvement of the coercive force Hc and the saturation magnetization density $\sigma_s$, and the reduction of crystallite diameter, and although it effectively functions in preventing the drop of $\sigma_s$ ($\Delta\sigma_s$) as is shown in the examples hereinafter, but those effects are exhibited only insufficiently if Co is incorporated at a content of not more than 5 at. %. On the other hand, if Co accounts for more than 50 at. %, the coercive force Hc is reversely impaired. Accordingly, Co is incorporated at an amount of more than 5 at. % but not more than 50 at. %. The preferred range of adding Co is in a range of more than 5 to 40 at. %, and more preferably, in a range of from 10 to 35 at. %.

The incorporation of Al has a distinguished effect in improving the dispersibility (also preventing the sintering in the reduction process under heating ) of such flat acicular fine particles and in maintaining the shape of the particles during the reduction process. If the content of Al is less than 0.1 at. %, the effect above cannot be expected, and if the content should exceed 30 at. %, the saturation magnetization is lowered as to impair the magnetic properties. Accordingly, the content of Al is limited to a range of 0.1 to 30 at. %, preferably, 1 to 20 at. %, and more preferably, in a range of 2 to 15 at. %. In case Al is incorporated as an Al compound (an oxide), the content of Al above does not refer to the content of the Al compound, but refers to the content of elemental Al of the compound.

Similar to Al, the rare earth elements (inclusive of Y) effectively function in preventing sintering from occurring on the metallic powder in the reduction process under heating, and further, improving the dispersibility. If the content thereof is less than 0.1 at. %, the effect is so small as the facilitate the sintering, and if the content exceeds 10 at. %, the content of the oxides of the element increases as to lower the saturation magnetization. This makes the powder unsuitable as a metallic magnetic powder. As the rare earth elements, there can be specifically mentioned Y, La, Ce, Pr, Nd, Sm, Tb, Dy, Gd, etc., and in case two or more of these elements are incorporated in combination thereof, they should be added as such that the content thereof in total should fall in a range of 0.1 to 10 at. %. It should be noted that the content of the elements above does not refer to the content of the compounds, but that it refers to the content of elements in the compounds.

As the elements belonging to Group 1a of the Periodic Table, there can be mentioned Li, Na, K, etc. If a soluble salt of these elements is adhered to the surface of the particles constituting the powder of the present invention, the dispersibility of the powder becomes inferior when dispersed in a resin binder, and the preservability as well as the resistance against weathering of the medium product are impaired. Accordingly, the concentration of these elements is confined to not more than 0.05% by weight; if a plurality of these elements are incorporated in combination thereof, the total concentration should be limited to not more than 0.05% by weight. Since these elements belonging to Group 1a of the Periodic Table accelerates the sintering during the reduction process in producing the flat acicular ferromagnetic powder, these elements are preferably removed as much as possible before the reduction step.

As the examples of the elements belonging to Group 2a of the Periodic Table, there can be mentioned Mg, Ca, Sr, Ba, etc. In case a soluble salt of these elements is adhered to the surface of the particles constituting the powder of the present invention, similarly, the dispersibility of the powder when dispersed in a resin binder is impaired and the preservability as well as the resistance against weather of the medium product are deteriorated. Accordingly, the concentration of these elements is confined to not more than 0.1% by weight; if a plurality of these elements are incorporated in combination thereof, the total concentration should be limited to not more than 0.1% by weight.

That is, if a Group 1a element as above is present in an amount exceeding 0.05% by weight in the flat acicular fine particles according to the present invention, the particles may not be dispersed in the binder resin, or the coated film may result in poor film strength. Furthermore, since these elements are soluble, they may precipitate on the surface of the tape when the tape is held for a certain duration of time as to form crystalline compounds, and these compounds causes an increase in drop out as to lower the storage stability of the tape. If the concentration of Group 2a elements should exceed 0.1% by weight, on the other hand, the miscibility of the powder with the resin would be deteriorated as to lower the strength of the coated film, and an extreme increase in concentration thereof impairs the storage stability of the tape in a manner similar to the case of the Group 1a elements.

The water content of the metallic magnetic powder is preferably controlled as such that the amount detected (released) at 100° C. is not more than 2.0% by weight, preferably not more than 1.5% by weight, and the amount thereof released at 300° C. is not more than 4.0% by weight, preferably not more than 3.0% by weight. The viscosity of the paint as well as the amount of binder absorbed by the powder are influenced by the water content of the powder, and if the water content detected at 100° C. is more than 2.0% by weight, or the water content detected at 300° C. is more than 4.0% by weight, the dispersibility thereof on coating becomes insufficient.

Size and Shape of the Particles

The size and the shape characteristics of the magnetic powder according to the present invention are described below. The term "flat acicular particles" as referred herein signifies that the acicular particles are flat and have a major axis length to the minor axis length ratio (axial ratio) of preferably 2 or greater, wherein the major axis length means the length along the longitudinal direction and the minor axis length means the maximum length along the transverse direction, and, that said acicular particles are flat particles having a cross section in the minor axis direction cut perpendicular to the major axis exhibit a larger width and a smaller width, wherein the ratio of the larger width to the smaller width (which is referred to in the present specification as "the cross section ratio in the minor axis direction") in the major axis direction is uniformly greater than 1, preferably 1.5 or greater.

Figure 2:
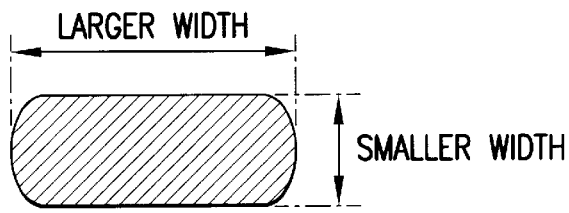
FIG. 2 is another drawing showing another example of the figure of a flat acicular particle, showing a cross section along the minor axis thereof.
Figure 3:
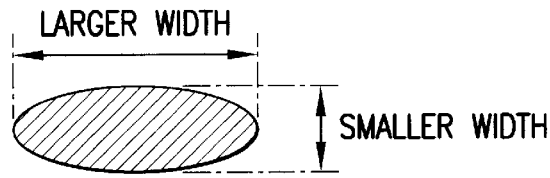
FIG. 3 is a yet other drawing showing another example of the figure of a flat acicular particle, showing a cross section along the minor axis thereof.
Figure 4:
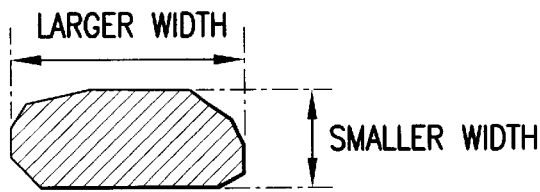
FIG. 4 is a still other drawing showing another example of the figure of a flat acicular particle, showing a cross section along the minor axis thereof.
Figure 5:
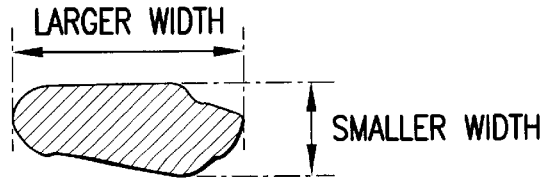
FIG. 5 is another drawing showing another example of the figure of a flat acicular particle, showing a cross section along the minor axis thereof.

FIG. 1 is a schematic drawing given as a means to explain the flat acicular shape. Referring to FIG. 1, in an acicular body 1 having a maximum length L in the longitudinal direction (i.e., the length of the major axis) and a maximum length S in the transverse direction perpendicular to the longitudinal direction (i.e., the length of the minor axis), the shape of the body can be seen to exhibit a flat shape having a cross section 2 in the minor axis direction cut perpendicular to the major axis with a larger width $W_L$ and a smaller width $W_S$. More specifically, the body may be said to have a figure similar to a plate (ribbon-like figure) having a width $W_L$ and a thickness $W_S$ However, the flat shape of the cross section 2 in the minor axis direction is not only limited to a rectangular shape as shown in FIG. 1, but can exhibit a capsule-like shape as in FIG. 2, an ellipsoidal shape as in FIG. 3, a polygonal shape as in FIG. 4, or a deformed disk-like shape as shown in FIG. 5. In short, it is required that the cross section ratio in the minor axis direction, i.e., the $W_L/W_S$ ratio, uniformly (i.e., without being twisted) yield a value greater than 1, and preferably, 1.5 or greater. Furthermore, the flat acicular particles according to the present invention are substantially free from branching.

The flat acicular metallic magnetic powder described above which have a mean major axis length of from 0.01 to 0.40 μm and an axial ratio of 2 or more, with a cross section ratio in the minor axis direction of greater than 1, preferably 1.5 or greater, can exhibit an excellent shape retainable property and magnetic properties in producing a high performance magnetic recording medium when it has a specified composition in accordance with the invention, as described in the examples hereinafter. In particular, even in case of such flat acicular fine particles, the saturation magnetization ($\sigma_s$) to the X-ray crystallite size ($D_x$) ratio, $\sigma_s/D_x$, yields a value of 0.7 or higher, and hence, both the shape retainable property and the magnetic properties are established. The X-ray crystallite size ($D_x$) of the flat acicular metallic particles can be determined by obtaining the half band width of a peak corresponding to the (110) crystallographic plane on a X-ray diffraction profile using a diffractometer, and then calculating the crystallite diameter by substituting Scherrer's equation.

The preferred size range of flat acicular particles is such that the mean major axis length falls in a range of from 0.01 to 0.4 μm, and more preferably, in a range of from 0.04 to 0.2 μm. If the mean major axis length is less than 0.01 μm, the particles exhibit super paramagnetism, and the electromagnetic conversion properties are extremely impaired. On the other hand, if the mean major axis exceeds 0.4 μm in length, the particles tend to consist of multiple magnetic domains as to impair the electromagnetic conversion properties. Thus, to maintain the desired magnetic properties, the fine particles are preferably acicular fine particles having a mean major axis length in a range of from 0.01 to 0.4 μm.

The crystallite size of the flat acicular metallic particles (i.e., the X-ray crystallite size $D_x$) is preferably in a range of from 50 to 250 Å and more preferably in a range of from 100 to 200 Å. If the crystallite size should be less than 50 Å, the particles become super paramagnetic as to extremely reduce the electromagnetic conversion properties. On the other hand, if the crystallite size exceeds 250 Å, the particles tend to increase the noise as to impair the electromagnetic conversion properties.

The true density of the ferromagnetic metallic powder of the present invention may be 5.55 g/cm³ or higher. In this manner, excellent magnetic properties can be maintained.

The specific surface area of the ferromagnetic metallic powder measured in accordance with the BET method is in a range of from 30 to 70 m²g, and preferably, in a range of from 40 to 60 m²/g. If the specific surface area is less than 30 m²/g, the miscibility of the powder with a resin in preparing a tape is impaired as to lower the electromagnetic conversion properties. If the specific surface area exceeds 70 m²/g, insufficient dispersion occurs in preparing the tape as to similarly decrease the electromagnetic conversion properties.

Figure 6:
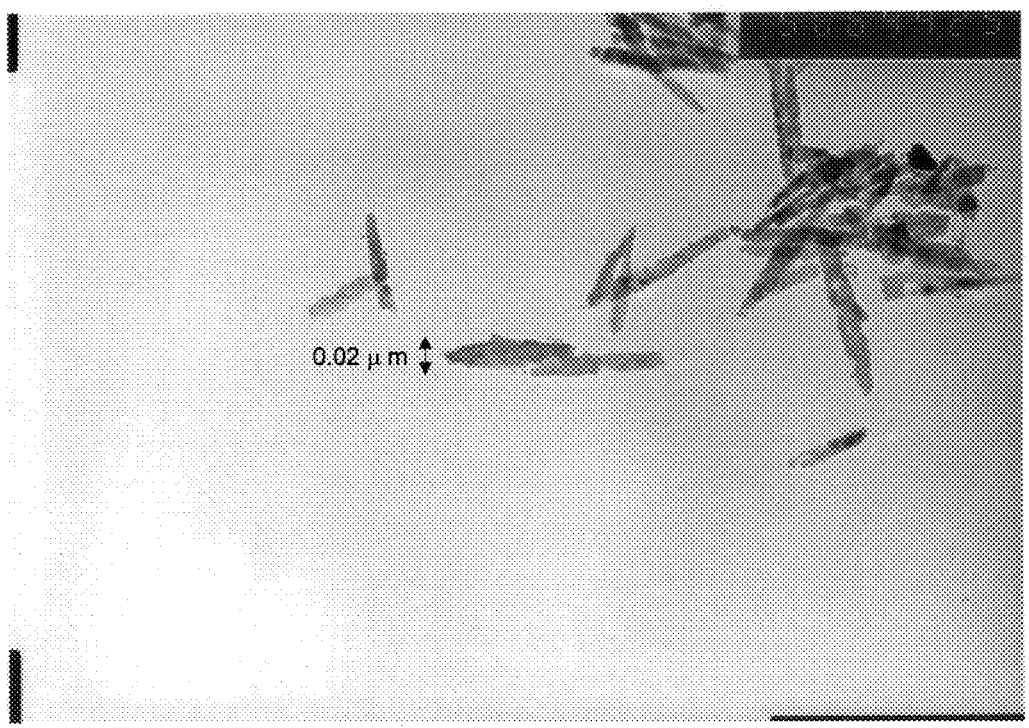
FIG. 6 is an electron micrograph (TEM image at a magnification of 300,000 times) showing the figure of the individual particles of the powder consisting of flat acicular ferromagnetic particles according to the present invention.
Figure 7:
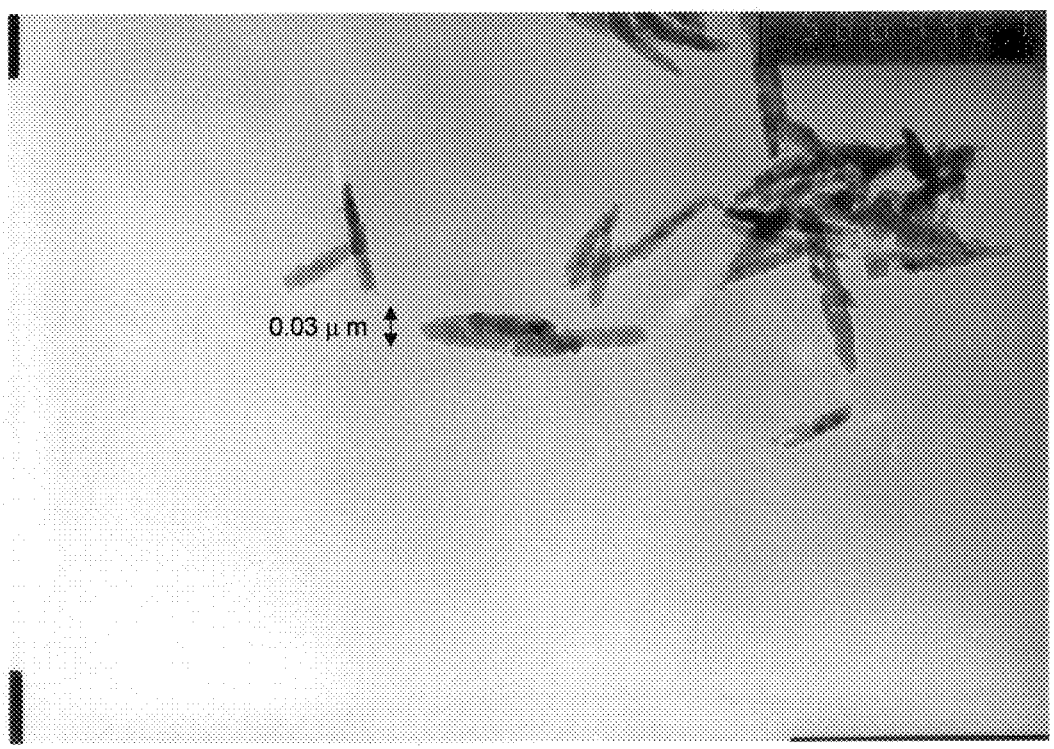
FIG. 7 is an electron micrograph of the same portion of the same specimen shown in FIG. 6, observed under the same magnification but by tilting the sample holder by an angle of 30°.

FIGS. 6 and 7 show the transmission electron micrograph (magnification: 300,000 times) of the same sample of ferromagnetic metallic powder according to the present invention obtained in Example 8 described hereinafter, in which the same portion of the same sample is observed under the same magnification while tilting the sample holder. That is, FIG. 6 shows the micrograph obtained while maintaining the sample holder horizontally, and FIG. 7 shows the micrograph of the sample observed by tilting the sample holder by 30° with respect to the horizontal position. By tilting the sample holder, the sample can be observed from different angles. Thus, in this manner, the change in the thickness along the direction of minor axis, i.e., the cross section ratio of the larger width to the smaller width in the minor axis direction, can be observed. For instance, for the isolated particle as observed in the center portion of the micrographs given in FIGS. 6 and 7, it can be seen that the maximum minor axis length is 0.02 μm in case of FIG. 6, while the same is obtained as 0.03 μm in FIG. 7. By thus tilting the sample holder, the particles were found to have a minor axis length changing approximately uniformly in the major axis direction. Further according to FIGS. 6 and 7, it can be seen that most of the particles are free from branching.

Figure 8:
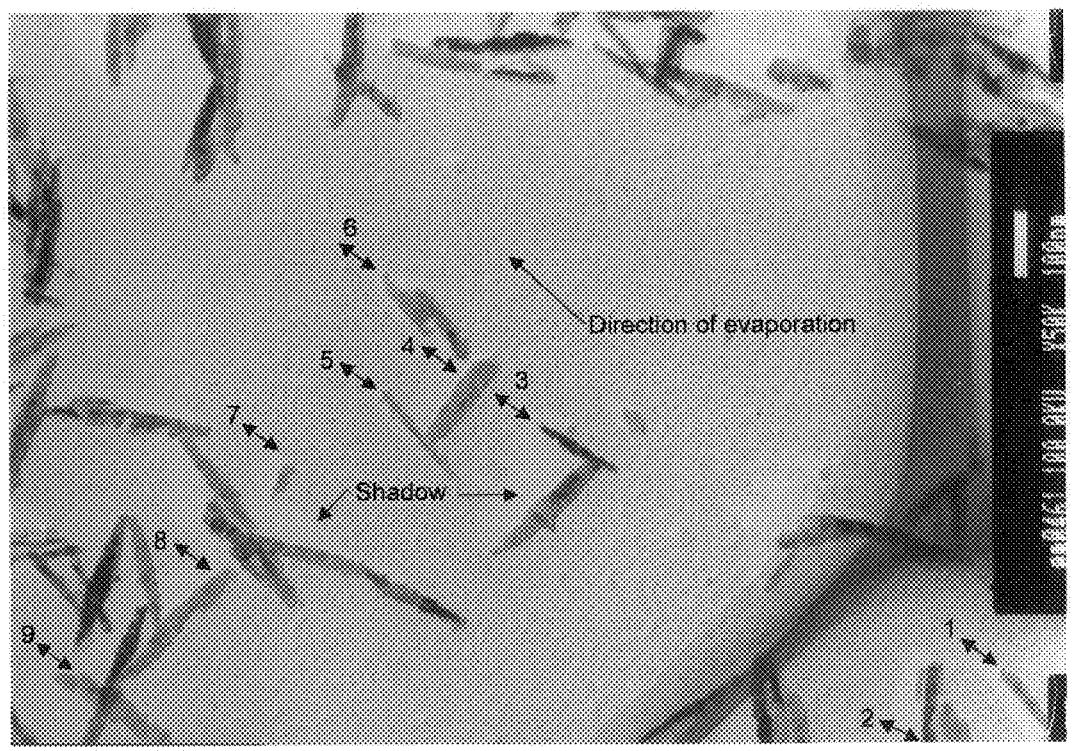
FIG. 8 an electron micrograph (TEM image at a magnification of 300,000 times) of the shadowed individual particles of the powder consisting of flat acicular ferromagnetic particles according to the present invention.

For instance, the cross section ratio in the minor axis direction can be measured in the following manner. More specifically, in FIG. 8 is shown an electron micrograph of the ferromagnetic powder according to the present invention obtained in Example 8 described hereinafter, wherein, the powder sample was scattered on an adhesive sample holder before taking the micrograph, and after mounting the powder-adhered specimen inside a vacuum evaporation chamber, vaporized metal was irradiated to the surface of the sample at a predetermined angle in such a manner that a shade should be formed by the irradiation at the portions having powder adhered thereon, wherein the shade is formed at the portion to which the vaporized metal is not irradiated by the existence of the particles. Thus, the shaded specimen is photographed under an electron micrograph. It can be seen from FIG. 8 that a shaded portion, i.e., the portion not irradiated with vaporized metal, is uniformly formed on one side of each of the particles. By measuring the length of the minor axis and the length of the shade for each of the particles, the cross section ratio in the minor axis direction can be obtained for each of the particles.

Figure 9:
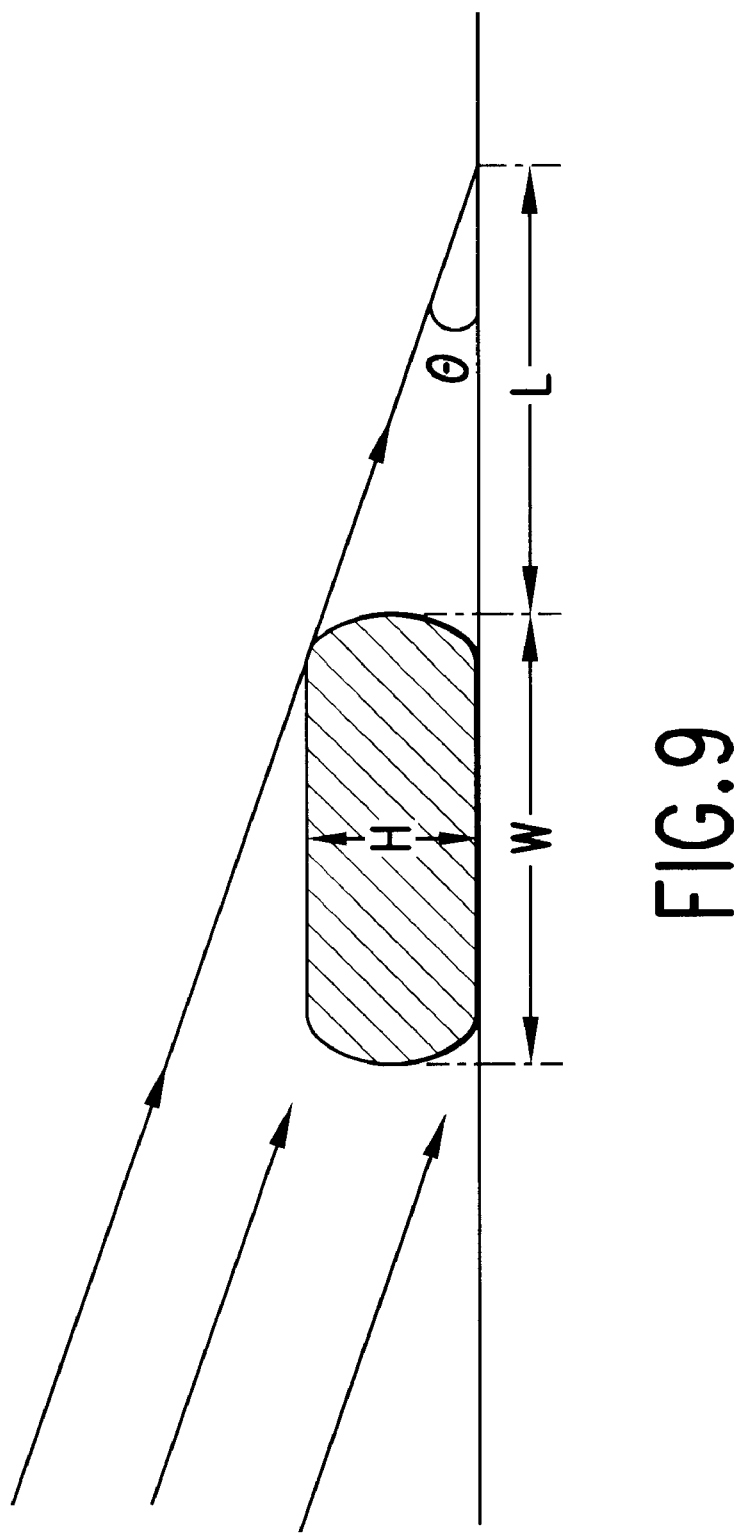
FIG. 9 is an explanatory drawing showing the relation between the projection angle the length of the shadow.

More specifically, as shown schematically in FIG. 9, when the vaporized metal is irradiated to a sample plane 1 by making an angle of θ with respect to the plane, the length L of the shade generated on a particle having a height of H and a width of W can be expressed as:

$$L = H/\tan \theta$$

Thus, H can be calculated from the angle θ and the measured length L, and the W/H ratio can be obtained from the value of H and the measured width W. In FIG. 8, the angle θ is equal to 18 degrees. In this manner, each of the particles observed in FIG. 8 were found to be flat acicular particles. Furthermore, from the thus obtained values of L and W on 100 particles, the average cross section ratio in the minor axis direction was confirmed to be 2.2.

Magnetic Properties

The ferromagnetic metallic particles according to the present invention yield a coercive force in a range of from 1,200 to 3,000 (Oe), a saturation magnetization ($\sigma_s$) in a range of from 100 to 200 emu/g, and a drop in saturation magnetization ($\sigma_s$), after allowing it to stand for 1 week at 60° C. under a relative humidity of 90% in a range of not more than 15%.

The higher the coercive force Hc of the metallic powder is, the more suitable is the powder for high density recording. However, the coercive force is controlled to fall in a range of from 1,200 to 3,000 (Oe), preferably from 1,600 to 2,800 (Oe), in accordance with the performance of the head.

The higher the saturation magnetization $\sigma_s$, the higher output can be obtained. However, by taking the resistance against oxidation, noise, etc., into consideration, the value of $\sigma_s$ is set in a range of from 100 to 200 emu/g, preferably in a range of from 120 to 200 emu/g, and more preferably, in a range of from 130 to 180 emu/g. If the saturation magnetization is more than 200 emu/g, magnetic agglomeration tends to occur in case of making a tape, and hence, it makes it difficult to produce a favorably drawn tape by using the present technology as to impair the surface smoothness of the resulting tape. If the saturation magnetization is less than 120 emu/g, a sufficient output may not be obtained.

The resistance against weathering can be evaluated from the drop ($\Delta\sigma_s\%$) in saturation magnetization ($\sigma_s$) after allowing the powder to stand for 1 week at 60° C. under a relative humidity of 90%, and the drop in saturation magnetization of the metallic powder according to the present invention is 15% or lower. In case the powder is used in a tape, the resistance against weathering of the tape can be evaluated similarly by the drop ($\Delta Bm\%$) in the saturation magnetic flux density (Bm) after allowing the tape to stand for 1 week at 60° C. under a relative humidity of 90%, and in the present case, this drop is 15% or lower.

To obtain a ferromagnetic powder suitable for high density recording, both the magnetic characteristics and the powder characteristics should be established at the same time. More specifically, the shape must be maintained even if the size of the particles is reduced, and the high saturation magnetization $\sigma_s$ must be retained. The ferromagnetic powder according to the present invention retains both of the excellent magnetic characteristics and the powder characteristics while exhibiting the various properties above. Whether the magnetic characteristics and the powder characteristics are well balanced or not can be evaluated by using the (saturation magnetization $\sigma_s$ (emu/g))/(crystallite size $D_x$ (angstrom)) ratio. The higher this ratio is, the better the balance is of these characteristics, and the better is the contribution to the improvement in the output and C/N ratio of the magnetic recording medium. The $\sigma_s/D_x$ ratio of the ferromagnetic powder according to the present invention can be 0.7 or higher, and furthermore, it can be 0.8 or higher. Moreover, this $\sigma_s/D_x$ ratio can be achieved even with flat acicular fine particles as fine as those having a major axis length of 0.1 μm or less and with those having a $\sigma_s$ of 150 emu/g or higher. Since the particles are flat acicular fine particles having a high saturation magnetization, the output and the C/N ratio can be greatly improved. In case of flat acicular particles having a $\sigma_s/D_x$ ratio of 0.8 or higher, a major axis length of 0.1 μm or less, and an Hc of 2,300 (Oe) or higher, preferably in a range of from 2,400 to 2,700 (Oe), the C/N ratio and the output can be greatly improved because they are flat acicular fine particles having a hgih coercive force.

Method for Preparing Metallic Magnetic Powder According to the Present Invention The metallic magnetic powder comprising flat acicular fine particles according to the present invention can be prepared by using flat acicular iron oxyhydroxide particles substantially free from branching as the starting material, and by heating and reducing these particles at an elevated temperature. To obtain flat acicular iron oxyhydroxide particles substantially free from branching, the following method can be employed advantageously.

For instance, there can be employed a process comprising adding an alkali hydroxide into an aqueous solution of a ferric salt such as ferric sulfate, ferric chloride, ferric nitrate, etc., at an equivalent value of 1.0 to 3.5 with respect to $Fe^{3+}$ ion to form a precipitate (a neutralized precipitate) at a temperature of 5° C. or higher; allowing flat acicular iron oxyhydroxide (FeOOH) particles to precipitate by holding the resulting suspension at a temperature higher than the former temperature; and separating the resulting precipitated iron oxyhydroxide from the suspension by solid-liquid separation (wherein, this treatment of precipitating iron oxyhydroxide from the suspension containing the neutralized precipitate is denoted as "ripening"). In this manner, flat acicular iron oxyhydroxide particles substantially free from branching and free from non-crystalline substance can be prepared. As compared with the case of producing a powder of acicular iron oxide ($Fe_2O_3$), the present method is advantageous because the present method does not incorporate any process step performed at a high temperature, and is thereby free from the problem of causing intergranular sintering.

In contrast to the method above, it is difficult to obtain flat acicular iron oxyhydroxide particles free from branching and yet exhibiting flattened cross section in the minor axis direction by employing the conventional methods as follows: i.e., for instance, a method comprising first preparing a suspension containing colloids of ferric hydroxide by adding an aqueous solution of alkali hydroxide to an aqueous solution of a ferric salt at an amount exceeding the equivalent value, and then performing an oxidation reaction by bubbling an oxygen-containing gas into the suspension at a pH of 11 or higher and at a temperature of 80° C. or lower; or a method comprising performing the oxidation reaction by introducing an oxygen-containing gas into a suspension obtained by reacting an aqueous solution of ferric salt and an aqueous solution of an alkali carbonate.

In case of producing a powder of flat acicular metallic magnetic particles according to the present invention by first preparing a powder consisting of flat acicular particles of iron oxyhydroxide as the starting material, Co is incorporated into the flat iron oxyhydroxide particles for in advance.

In order to incorporate Co, for instance, a salt of cobalt (I) (e.g., cobalt (I) sulfate, cobalt (I) chloride, cobalt (I) nitrate, etc.) or a salt of cobalt (II) (e.g., cobalt (II) sulfate, cobalt (II) chloride, cobalt (II) nitrate, etc.) can be added at such a quantity that the Co may account for 5 to 50 at. % with respect to the trivalent iron ion included in the ferric salt in any of the stages before neutralization (before adding an alkali hydroxide), just after neutralization, or during the ripening treatment described above.

To further incorporate Al into the thus prepared Co-containing flat acicular particles of iron oxyhydroxide used as the starting material, a proper Al compound may be allowed to adhere to the surface of the particles, and the resulting particles are subjected to the reduction treatment. As usable Al compounds, such as a water-soluble salt of Al, e.g., $Al_2(SO_4)_3$, $Al(NO_3)_3$, and $AlCl_3$, etc., or a water-soluble aluminate such as $NaAlO_2$ (sodium aluminate). To coat the surface of a particle to be reduced with Al compounds by using such aluminum compounds, the iron oxyhydroxide formed by the aforementioned ripening can be treated with those Al compounds. More specifically, for instance, these Al compounds may be dissolved in an alkaline aqueous solution, and after dispersing the iron oxyhydroxide above, gaseous carbon dioxide or an acid may be added therein for neutralization. In this manner, the particles can be coated with Al compounds in the form of a crystalline or amorphous $Al_2O_3 \cdot nH_2O$ (hydrated aluminum oxide).

Further, Al can be incorporated (impregnated) into the particles obtained above in the form of solid solution. To prepare Co-containing iron oxyhydroxide with Al incorporated (occluded) in the form of solid solution, the water-soluble Al salts or aluminates above may be provided to be present in the reaction system for generating the iron oxyhydroxide. That is, an Al compound is allowed to coexist at the stage of precipitating the iron oxyhydroxide by ripening. For instance, the ripening described above may be carried out by adding any of the Al compounds above in a suspension containing a colloid of ferric hydroxide, or by adding any of the Al compounds above in advance into the solution at forming, or at the step prior to forming the neutralization precipitate. By carrying out the ripening above in the presence of dissolved Al in this manner, further favorable flat acicular iron oxyhydroxide particles can be obtained as compared with the case Al is not dissolved in the solution.

By heating the thus obtained Co—Al-containing iron oxyhydroxide or iron oxide, Al can be fixed in the form of $Al_2O_3$ (in this case, iron oxyhydroxide is changed into iron oxide by the dehydration reaction), and a rare earth element is incorporated therein. As the methods for incorporating a rare earth element, there can be mentioned, for instance, dispersing the particles in a solution containing rare earth elements and adding an alkali further therein to allow the rare earth element to precipitate on the particles in the form of a hydroxide, or a method comprising dispersing the particles in a solution containing a rare earth element compound and then allowing water to remove therefrom by evaporation.

The powder of iron oxide incorporated therein Co, Al, and a rare earth element each at a predetermined amount is then heated under a reducing atmosphere. Then, after controlling the humidity, there can be obtained a metallic magnetic powder comprising iron as the main component and Co, Al, and a rare earth element as additional components, and further containing a proper amount of water. To obtain a powder containing trace amount of the elements belonging to Group 1a or Group 2a of the Periodic Table, there can be employed a method comprising using a raw material free from the elements belonging to Group 1a or Group 2a of the Periodic Table, or by a method comprising sufficiently applying rinsing to each of the stages in which the iron oxyhydroxide, iron oxide, or the metallic magnetic powder is obtained. Concerning the latter method, the rinsing efficiency increases with advancing process steps, because these elements gradually segregate on the surface of the particles. Furthermore, the removal can be more efficiently carried out by using a rinsing water lowered in pH by adding an acid therein and elevating its temperature. Thus, by properly combining the former and the latter methods, the content of the elements above can be lowered to a predetermined concentration or even lower. As the representative elements belonging to Group 1a of the Periodic Table, there can be mentioned Li, Na, or K. As the elements belonging to Group 2a of the Periodic Table, there can be representatively mentioned Mg, Ca, Sr, Ba, etc.

In case of producing a powder of flat acicular ferromagnetic particles by using flat acicular iron oxyhydroxide as the starting material, there can be advantageously obtained a ferromagnetic powder consisting of particles maintaining the flat acicular shape of the starting iron oxyhydroxide particles reduced in pores, or completely free of pores, compared with the conventional acicular ferromagnetic particles. The reason for this advantage in the present method is, presumably, because the pores in the present case can be more easily removed in the reduction stage under heating. Accordingly, the ferromagnetic particles obtained according to the present invention can be almost free from causing breakage or deformation. Thus, the powder enables a high coercive force as to realize a magnetic recording medium having a high output performance.

The ferromagnetic powder consisting of flat acicular particles according to the present invention becomes suitable for use in high density recording by preparing a magnetic layer or an upper layer (i.e., the magnetic layer that is formed on a non-magnetic layer) of a multilayer structure employed in a coating type magnetic recording medium in accordance with a conventional method. As a support for forming thereon a coating layer or coating layers, usable are the known films such as those made of polyesters, e.g., polyethylene terephthalate, polyethylene naphthalate, etc., or of polyolefins, cellulose acetate, polycarbonate, polyamide, polyimide, polyamide-imide, polysulfone aramid, aromatic polyamide, etc.

The characteristics of the ferromagnetic powder according to the present invention is described in further detail below by way of examples.

EXAMPLES

Example 1

Flat acicular FeOOH particles having a mean major axis length of 0.13 μm, an average axial ratio of 5, and a cross section ratio in the minor axis length of approximately 1.3, and containing 10 at. % of Co with respect to Fe were prepared. The flat acicular FeOOH particles were obtained by adding, into an aqueous solution of a ferric salt (an aqueous solution of ferric sulfate), an aqueous solution containing NaOH at an equivalent value of 1.6 with respect to $Fe^{3+}$ ion to obtain a precipitate, and by then performing ripening for a time duration of 16 hours while holding the suspension containing the precipitate at a temperature of 45° C. During the ripening, a cobalt (I) salt (cobalt (I) sulfate) was added into the suspension to incorporate Co into the particles.

Separately, a solution was prepared by dissolving 9.8 g of aluminum sulfate [$Al_2(SO_4)_3$] in 5 liters of pure water, and the pH value thereof was adjusted to 12.5 by using an aqueous solution containing NaOH at a concentration of 10%.

To the solution thus obtained, 50 g of the aforementioned powder consisting of Co-containing flat acicular FeOOH particles was added to obtain a suspension, and while sufficiently applying stirring, gaseous carbon dioxide was blown into the slurry for neutralization to adjust the pH value to 9 or lower. By thus covering the surface of the FeOOH particles with hydrated aluminum oxide ($Al_2O_3 \cdot nH_2O$), the resulting particles coated with hydrated aluminum oxide were separated by filtration, rinsed, and heated at 400° C. for a time duration of 3 hours to obtain Co-containing iron oxide coated with $Al_2O_3$. The particles thus obtained contain 4.7 at. % of Al with respect to Fe and Co.

The resulting particles were then suspended in 1 liter of aqueous solution containing dissolved therein 3.56 g of lanthanum nitrate [$La(NO_3)_3$]. After sufficiently applying stirring, the slurry was placed inside a dryer to allow the water incorporated therein to evaporate at 100° C., and the resulting product was suspended in 5 liters of pure water. The suspension was then filtered to a cake, which followed to be heated, rinsed with pure water of 60° C., and dried.

The iron oxide particles containing Al, La, and Co thus obtained were reduced by heating at 450° C. for a duration of 10 hours in a rotary furnace while introducing therein a flow of $H_2$ gas. On completion of the reduction, a flow of $N_2$ gas was introduced to cool the furnace to room temperature, and gradual oxidation treatment was applied to the resulting product by introducing $N_2$ gas containing 1% of $O_2$. Thus was obtained a metallic magnetic powder containing Al, La, and Co. Furthermore, a sequential operation was carried out under a gaseous $N_2$ atmosphere as a post treatment to the resulting product, wherein the process comprises suspending the powder in a pure water containing gaseous carbon dioxide, filtering the suspension, rinsing the powder and drying it.

In Tables 1 and 2 are given the analytical values, powder characteristics, and the magnetic properties of the thus obtained metallic magnetic powders.

Furthermore, a tape using the metallic magnetic powder above for the magnetic layer was prepared in the following manner, and the tape characteristics, electromagnetic conversion characteristics, as well as the surface roughness thereof, were obtained. The results are given in Tables 1 and 2.

Method of Producing the Tape (1) A Paint for Use in the Lower Layer Having the Following Composition Was Prepared to Form the Lower Layer.

| | |
|---|---|
| Iron oxyhydroxide | 100 parts by weight |
| (In example 1, it has a major axis length of 0.15 μm and releases water of 1.0% by weight at 100° C.) | |
| Polyurethane resin | 20 parts by weight |
| Methyl ethyl ketone | 165 parts by weight |
| Cyclohexenone | 65 parts by weight |
| Toluene | 165 parts by weight |
| Stearic acid | 1 part by weight |
| Acetyl acetone | 1 part by weight |

A paint was obtained by dispersing the components above in a centrifugal ball mill for a duration of 1 hour, and the resulting paint was applied to a base film made of polyethylene terephthalate by using an applicator, to thereby obtain a lower layer having a final thickness of 3 μm.

(2) A Paint for Use in the Upper Layer Having the Composition Below Was Prepared to Form an Upper Layer.

| | |
|---|---|
| Metallic magnetic powder above | 100 parts by weight |
| Polyurethane resin | 30 parts by weight |
| Methyl ethyl ketone | 190 parts by weight |
| Cyclohexenone | 80 parts by weight |
| Toluene | 110 parts by weight |
| Butyl stearate | 1 part by weight |
| Acetyl acetone | 1 part by weight |
| α-alumina | 3 parts by weight |
| Carbon black | 2 parts by weight |

A paint for the upper layer was obtained by dispersing the components above in a centrifugal ball mill for a duration of 1 hour, and the resulting paint was applied to the lower layer above by using an applicator. The resulting sheet-like specimen was further subjected to calendering treatment and slit to a width of 8 mm to obtain a magnetic tape having an upper layer formed at a thickness of from 0.5 to 0.6 μm.

Evaluation

The powder characteristics, magnetic properties, also tape characteristics, electromagnetic conversion characteristics, and the surface roughness were evaluated in the following manner.

The mean major axis length, the mean minor axis length, and the axial ratio were expressed by the mean value of 100 particles observed in an electron micrograph taken at a magnification of 174,000 times.

The cross section ratio in the minor axis direction was measured in accordance with the tilted vacuum evaporation method explained above in FIG. 8 on taking the electromigraphs The crystallite size (denoted as $D_x$ in the Table) was determined by obtaining the half band width of a peak corresponding to the (110) crystallographic plane on a X-ray diffraction profile using a X-ray diffractometer, and by then calculating the crystallite diameter by substituting Scherrer's equation.

The specific surface area (denoted as "BET" in the Table) was obtained in accordance with BET method, and the amount of absorbed stearic acid was determined by first dispersing the powder sample in a MEK solution containing 2% of stearic acid, and after allowing the powder sample to settle in the solution by using a centrifugal separator, the concentration of the supernatant liquid was obtained to calculate the absorbed amount per specific surface area.

The pH value of the powder was obtained in accordance with the method described in JIS K5101. The true specific gravity was measured according to the immersion method using toluene as a solvent. Similarly, the tap density was obtained according to JIS K5101. The water content of the powder was obtained from the weight change at 100° C. according to Karl Fischer's method. The equipotential point was obtained by measuring the ζ-potential in accordance with microscopic electrophoresis.

Concerning the magnetic properties shown in the Table, Hc represents the coercive force (Oe), $\sigma_s$ represents the saturation magnetization (emu/g) of the magnetic powder, $\sigma_r$ represents the residual flux density (emu/g) of the magnetic powder, $\sigma_r/\sigma_s$ represents the rectangular ratio in hysteresis loop, $\Delta\sigma_s(\%)$ represents the drop in saturation magnetization ($\sigma_s$) after allowing it to stand for 1 week at 60° C. under a relative humidity of 90%, and $\sigma_s/D_x$ represents the ratio of the saturation magnetization ($\sigma_s$) to the X-ray crystallite size ($D_x$). The higher this ratio is, the better are the retention of shape and the magnetic properties.

Further concerning the tape characteristics, Br represents the residual flux density (Gauss) of the tape, Bm represents the saturation flux density (gauss) of the tape, and Br/Bm is the rectangular ratio. $\Delta$Bm (%) represents the drop in Bm after allowing the tape to stand for 1 week at 60° C. under a RH (relative humidity) of 90%.

The output and the C/N ratio of the electromagnetic conversion characteristics were measured by using a Hi8 deck. The surface smoothness was evaluated by measuring the roughness Ra of the surface of the tape by using a three-dimensional fine profiler (Model ET-30HK) manufactured by Kosaka Laboratory Co., Ltd.

Example 2

The same procedure as described in Example 1 was followed in preparing FeOOH particles, except that the particles contained 20 at. % of Co with respect to Fe, and that they had a mean major axis length of 0.15 μm, an average axial ratio of 5, and a cross section ratio in the minor axis direction of 1.5. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 3

The same procedure as described in Example 1 was followed in preparing FeOOH particles, except that the particles contained 30 at. % of Co with respect to Fe, and that they had a mean major axis length of 0.14 μm, an average axial ratio of 7, and a cross section ratio in the minor axis direction of 1.6. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 4

The same procedure as described in Example 1 was followed in preparing FeOOH particles, except that the particles contained 40 at. % of Co with respect to Fe, and that they had a mean major axis length of 0.18 μm, an average axial ratio of 7, and a cross section ratio in the minor axis direction of 1.1. Furthermore, an aqueous solution containing dissolved therein 3.58 g of cerium nitrate was used in the place of lanthanum nitrate. The other procedures were the same as those described in Example 1. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 5

The same procedure as described in Example 1 was followed in preparing FeOOH particles, except that the particles contained 50 at. % of Co with respect to Fe, and that they had a mean major axis length of 0.13 μm, an average axial ratio of 7, and a cross section ratio in the minor axis direction of 1.6. Furthermore, an aqueous solution containing dissolved therein 4.8 g of yttrium nitrate was used in the place of lanthanum nitrate. The other procedures were the same as those described in Example 1. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 6

The same procedure as described in Example 3 was followed, except for performing the heating reduction in flowing H2 gas at 350° C. and for a time duration of 30 hours, instead of performing the reduction at 450° C. and for 10 hours. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 7

The same procedure as described in Example 5 was followed, except for performing the heating reduction in flowin $H_2$ gas at 350° C. and for a time duration of 30 hours, instead of performing the reduction at 450° C. and for 10 hours. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 8

The same procedure as described in Example 7 was followed in preparing FeOOH particles, except that the particles contained 30 at. % of Co with respect to Fe, and that they had a mean major axis length of 0.19 μm, an average axial ratio of 8, and a cross section ratio in the minor axis direction of 1.6. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 9

The same procedure as described in Example 8 was followed in preparing FeOOH particles, except that the amount of aluminum nitrate [$Al_2(SO_4)_3$] dissolved in 5 liters of pure water was changed to 7.85 g and an aqueous solution containing dissolved therein 3.6 g of cerium nitrate was used in place of yttrium nitrate. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 10

The same procedure as described in Example 9 was followed in preparing FeOOH particles, except that the particles contained 35 at. % of Co with respect to Fe, and that they had a mean major axis length of 0.11 μm, an average axial ratio of 10, and a cross section ratio in the minor axis direction of 2.1. Furthermore, the amount of aluminum nitrate [$Al_2(SO_4)_3$] dissolved in 5 liters of pure water was changed to 6.0 g. The other procedures were the same as those described in Example 9. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 11

The same procedure as described in Example 1 was followed in preparing FeOOH particles, except that the particles contained 30 at. % of Co with respect to Fe, and that they had a mean major axis length of 0.13 μm, an average axial ratio of 8, and a cross section ratio in the minor axis direction of 2.5. Furthermore, the amount of aluminum nitrate $[Al_2(SO_4)_3]$ dissolved in 5 liters of pure water was changed to 6.0 g, the thus obtained FeOOH particles were suspended in an aqueous solution the pH value of which was adjusted to 12.5 by using an aqueous solution containing NaOH at a concentration of 10%, and an aqueous solution dissolved therein 4.7 g of yttrium nitrate $[Y_2(NO_3)_3]$ was used in the place of an aqueous solution of lanthanum nitrate. Then, rapidly cooling was performed on the resulting powder after heating for reduction in a rotary furnace at 350° C. for a duration of 30 hours while introducing a flow of $H_2$. Gas. The other procedures were the same as those described in Example 1. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 12

The same procedure as described in Example 11 was repeated, except for changing the amount of yttrium nitrate from 4.7 g to 6.2 g. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 13

The same procedure as described in Example 11 was repeated, except for changing 4.7 g of yttrium nitrate to 4.5 g of neodymium nitrate. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 14

The same procedure as described in Example 11 was followed in preparing FeOOH particles, except that the particles contained 30 at. % of Co with respect to Fe, and that they had a mean major axis length of 0.16 μm, an average axial ratio of 8, and a cross section ratio in the minor axis direction of 2.1. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 15

The same procedure as described in Example 11 was followed in preparing FeOOH particles, except that the particles contained 40 at. % of Co with respect to Fe, and that they had a mean major axis length of 0.11 μm, an average axial ratio of 10, and a cross section ratio in the minor axis direction of 2.7. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 16

The same procedure as described in Example 11 was followed in preparing FeOOH particles, except that the particles contained 40 at. % of Co with respect to Fe, and that they had a mean major axis length of 0.18 μm, an average axial ratio of 8, and a cross section ratio in the minor axis direction of 1.7. Furthermore, the same procedure as described in Example 11 was repeated, except for changing the amount of yttrium nitrate from 4.7 g to 2.45 g. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 17

The same procedure as described in Example 11 was followed in preparing FeOOH particles, except that the particles contained 35 at. % of Co with respect to Fe, and that they had a mean major axis length of 0.16 μm, an average axial ratio of 8, and a cross section ratio in the minor axis direction of 2.4. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 18

The same procedure as described in Example 11 was followed in preparing FeOOH particles, except that the particles had a mean major axis length of 0.08 μm, an average axial ratio of 8, and a cross section ratio in the minor axis direction of 1.5. Furthermore, the same procedure as described in Example 11 was repeated, except for changing the amount of yttrium nitrate from 4.7 g to 6.5 g. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 19

The same procedure as described in Example 13 was followed in preparing FeOOH particles, except that the particles had a mean major axis length of 0.19 μm, an average axial ratio of 8, and a cross section ratio in the minor axis direction of 2.0. Furthermore, the same procedure as described in Example 13 was repeated, except for performing the gradual oxidation treatment for a duration of 2 hours while introducing gaseous $N_2$ containing 0.2% of $O_2$ instead of the gaseous $N_2$ containing 1% of $O_2$. The chemical analysis data, powder characteristics and magnetic properties of the thus obtained metallic magnetic powder, as well as the tape characteristics, electromagnetic conversion characteristics, and surface roughness, are shown in Tables 1 to 2.

Example 20

The same procedure as described in Example 14 was repeated, except for performing the gradual oxidation treatment for a duration of 2 hours while introducing $N_2$ gas containing 0.2% of $O_2$ instead of the $N_2$ gas containing 1% of $O_2$. The chemical analysis data, powder characteristics and magnetic properties of the thus obtained metallic magnetic powder, as well as the tape characteristics, electromagnetic conversion characteristics, and surface roughness, are shown in Tables 1 to 2.

Comparative Example 1

The same procedure as described in Example 1 was followed in preparing FeOOH particles, except that the particles were completely free of Co, and that they had a mean major axis length of 0.13 μm, an average axial ratio of 5, and a cross section ratio in the minor axis direction of 1.2. The chemical analysis data, powder characteristics and magnetic properties of the thus obtained metallic magnetic powder, as well as the tape characteristics, electromagnetic conversion characteristics, and surface roughness, are shown in Tables 1 to 2.

Comparative Example 2

The same procedure as described in Example 1 was followed, except for not coating the particles with La by omitting the process step of suspending the particles in an aqueous solution of lanthanum nitrate. The chemical analysis data, powder characteristics and magnetic properties of the thus obtained metallic magnetic powder, as well as the tape characteristics, electromagnetic conversion characteristics, and surface roughness, are shown in Tables 1 to 2.

Comparative Example 3

The same procedure as described in Example 1 was followed in preparing FeOOH particles, except that the particles contained 50 at. % of Co with respect to Fe, and that they had a mean major axis length of 0.13 μm, an average axial ratio of 5, and a cross section ratio in the minor axis direction of 1.2, that no coating of the particles with La was performed by omitting the process step of suspending the particles in an aqueous solution of lanthanum nitrate, that the gradual oxidation treatment was performed for a duration of 1 hour while using $N_2$ gas containing 0.03% of $O_2$ instead of the $N_2$ gas containing 1% of $O_2$, and that the rinsing step after the gradual oxidation treatment step was omitted. The chemical analysis data, powder characteristics and magnetic properties of the thus obtained metallic magnetic powder, as well as the tape characteristics, electromagnetic conversion characteristics, and surface roughness, are shown in Tables 1 to 2.

Comparative Example 4

The same procedure as described in Example 1 was followed, except for preparing ellipsoidal FeOOH particles containing 10 at. % of Co with respect to Fe and having a mean major axis length of 0.13 μm and an axial ratio of 4. The ellipsoidal FeOOH particles thus obtained yielded a cross section ratio in the minor axis direction of 1 (circular), and were prepared by adding 20 liters of an aqueous solution of ferrous sulfate containing 20 mol of $Fe^{2+}$ at 47° C. into a mixed solution comprising 20 liters of an aqueous solution containing 25 mol of $NaCO_3$ and 10 liters of an aqueous solution containing 15 mol of NaOH, followed by adding an aqueous solution containing $CoSO_4$ at a Co equivalent value of 10 mol%, and then introducing air into the resulting suspension at a rate of 90 liters per minute for a duration of 300 minutes at a temperature of 47° C.

TABLE 1

| | Chemical composition | | | | | Powder characteristics | | | |
|---|---|---|---|---|---|---|---|---|---|
| Ex. No. | Co At. % | Al at. % | Rare Earth elements at. % | | Na wt. % | Ca wt. % | Major axis length μm | Minor axis length μm | Axial ratio | Cross section ratio in minor axis direction |
| Ex. 1 | 10 | 4.7 | La | 4.8 | 0.004 | 0.004 | 0.080 | 0.027 | 3 | 1.8 |
| Ex. 2 | 20 | 4.7 | La | 4.8 | 0.004 | 0.004 | 0.090 | 0.030 | 3 | 2.1 |
| Ex. 3 | 30 | 4.7 | La | 4.8 | 0.004 | 0.004 | 0.080 | 0.020 | 4 | 2.2 |
| Ex. 4 | 40 | 4.7 | Ce | 4.8 | 0.004 | 0.004 | 0.110 | 0.028 | 4 | 1.5 |
| Ex. 5 | 50 | 4.7 | Y | 4.8 | 0.004 | 0.004 | 0.080 | 0.020 | 4 | 2.2 |
| Ex. 6 | 30 | 4.7 | La | 4.8 | 0.004 | 0.004 | 0.100 | 0.020 | 5 | 3.1 |
| Ex. 7 | 50 | 4.7 | Y | 4.8 | 0.004 | 0.004 | 0.105 | 0.021 | 5 | 3.2 |
| Ex. 8 | 30 | 4.7 | Y | 4.8 | 0.005 | 0.004 | 0.115 | 0.023 | 5 | 2.2 |
| Ex. 9 | 30 | 3.7 | Ce | 4.8 | 0.004 | 0.004 | 0.105 | 0.021 | 5 | 2.5 |
| Ex. 10 | 35 | 2.9 | Ce | 4.8 | 0.004 | 0.004 | 0.070 | 0.012 | 6 | 2.9 |
| Ex. 11 | 30 | 2.9 | Y | 4.8 | 0.004 | 0.004 | 0.080 | 0.016 | 5 | 3.5 |
| Ex. 12 | 30 | 2.9 | Y | 6.2 | 0.004 | 0.004 | 0.075 | 0.015 | 5 | 2.5 |
| Ex. 13 | 30 | 2.9 | Nd | 6.2 | 0.003 | 0.004 | 0.075 | 0.015 | 5 | 2.4 |
| Ex. 14 | 30 | 2.9 | Y | 4.8 | 0.004 | 0.004 | 0.100 | 0.020 | 5 | 3.0 |
| Ex. 15 | 40 | 2.9 | Y | 4.8 | 0.004 | 0.004 | 0.070 | 0.012 | 6 | 3.8 |
| Ex. 16 | 40 | 2.9 | Y | 2.5 | 0.004 | 0.004 | 0.110 | 0.022 | 5 | 2.4 |
| Ex. 17 | 35 | 2.9 | Y | 4.8 | 0.004 | 0.004 | 0.100 | 0.020 | 5 | 3.4 |
| Ex. 18 | 30 | 2.9 | Y | 6.5 | 0.004 | 0.004 | 0.050 | 0.010 | 5 | 2.1 |
| Ex. 19 | 30 | 2.9 | Nd | 6.2 | 0.004 | 0.004 | 0.115 | 0.023 | 5 | 2.8 |
| Ex. 20 | 30 | 2.9 | Y | 4.8 | 0.004 | 0.004 | 0.100 | 0.020 | 5 | 3.0 |
| Comp. Ex. 1 | 0 | 4.7 | La | 4.8 | 0.004 | 0.004 | 0.100 | 0.033 | 3 | 1.4 |
| Comp. Ex. 2 | 30 | 4.7 | | 0 | 0.004 | 0.004 | 0.100 | 0.033 | 3 | 1.2 |
| Comp. Ex. 3 | 50 | 4.7 | | 0 | 0.13 | 0.12 | 0.150 | 0.050 | 3 | 1.3 |
| Comp. Ex. 4 | 10 | 4.7 | La | 4.8 | 0.004 | 0.004 | 0.080 | 0.020 | 4 | 1.0 |

TABLE 1-continued

Powder characteristics (continued)

| Ex. No. | Powder pH | Amount of absorbed stearic acid mg/cm² | Equipotential point PH | True density g/cm³ | Tap density | Released water wt. % (100° C.) | Released water wt. % (300° C.) | BET m²/g | Dx Å |
|---|---|---|---|---|---|---|---|---|---|
| Ex. 1 | 9.6 | 104 | 7.5 | 5.84 | 0.62 | 1.04 | 1.71 | 58 | 185 |
| Ex. 2 | 9.5 | 107 | 7.3 | 5.89 | 0.55 | 1.05 | 1.64 | 57 | 180 |
| Ex. 3 | 9.1 | 102 | 7.6 | 5.87 | 0.60 | 0.96 | 1.41 | 52 | 180 |
| Ex. 4 | 9.3 | 101 | 7.9 | 5.89 | 0.58 | 0.95 | 1.40 | 47 | 200 |
| Ex. 5 | 9.7 | 103 | 7.3 | 5.94 | 0.57 | 0.99 | 1.42 | 50 | 180 |
| Ex. 6 | 9.5 | 105 | 7.6 | 6.21 | 0.55 | 1.04 | 1.62 | 51 | 165 |
| Ex. 7 | 9.4 | 97 | 7.5 | 6.20 | 0.57 | 1.10 | 1.97 | 47 | 167 |
| Ex. 8 | 9.6 | 85 | 7.9 | 6.15 | 0.58 | 1.25 | 2.03 | 41 | 185 |
| Ex. 9 | 9.4 | 99 | 7.6 | 6.25 | 0.57 | 1.10 | 1.57 | 44 | 176 |
| Ex. 10 | 9.5 | 105 | 7.8 | 6.31 | 0.58 | 1.04 | 1.42 | 50 | 144 |
| Ex. 11 | 9.4 | 96 | 7.8 | 6.14 | 0.59 | 1.10 | 1.93 | 43 | 157 |
| Ex. 12 | 9.4 | 93 | 7.6 | 6.14 | 0.60 | 1.10 | 1.88 | 41 | 170 |
| Ex. 13 | 9.6 | 97 | 7.5 | 6.32 | 0.60 | 0.98 | 1.60 | 43 | 172 |
| Ex. 14 | 9.3 | 101 | 7 | 6.21 | 0.58 | 0.98 | 1.65 | 47 | 165 |
| Ex. 15 | 9.4 | 97 | 7.9 | 6.31 | 0.62 | 1.11 | 1.95 | 42 | 135 |
| Ex. 16 | 9.2 | 99 | 7.8 | 6.35 | 0.59 | 0.99 | 1.50 | 49 | 170 |
| Ex. 17 | 9 | 93 | 7.6 | 6.34 | 0.58 | 0.92 | 1.58 | 43 | 160 |
| Ex. 18 | 9.4 | 110 | 7.8 | 6.17 | 0.66 | 0.98 | 1.60 | 55 | 130 |
| Ex. 19 | 9.4 | 92 | 7.8 | 6.39 | 0.58 | 1.08 | 1.72 | 32 | 185 |
| Ex. 20 | 9.3 | 101 | 7.7 | 6.15 | 0.58 | 1.06 | 1.83 | 47 | 165 |
| Comp. Ex. 1 | 9.3 | 110 | 7.4 | 5.79 | 0.58 | 1.04 | 1.49 | 60 | 180 |
| Comp. Ex. 2 | 8.6 | 111 | 7.1 | 5.58 | 0.52 | 1.08 | 1.58 | 61 | 200 |
| Comp. Ex. 3 | 9.9 | 105 | 7.0 | 5.77 | 0.54 | 1.06 | 1.57 | 55 | 220 |
| Comp. Ex. 4 | 10.0 | 109 | 8.2 | 5.61 | 0.55 | 1.04 | 2.00 | 71 | 190 |

TABLE 2

| | Magnetic Properties | | | | Tape characteristics | | | | Electromagnetic conversion characteristics | | |
|---|---|---|---|---|---|---|---|---|---|---|---|
| Ex. No. | Hc Oe | σs emu/g | σr/σs | Δσs % | σs/Dx | Hc Oe | Bm G | Br/Bm % | ΔBm | Output dB | C/N dB | Surface roughness Å |
| Ex. 1 | 1935 | 138 | 0.51 | 10 | 0.75 | 1995 | 3900 | 0.81 | 11 | 4.1 | 2.9 | 98 |
| Ex. 2 | 2250 | 140 | 0.52 | 10 | 0.78 | 2310 | 4200 | 0.83 | 11 | 5.2 | 3.4 | 93 |
| Ex. 3 | 2180 | 145 | 0.52 | 11 | 0.81 | 2215 | 4500 | 0.82 | 11 | 5.4 | 3.3 | 97 |
| Ex. 4 | 1890 | 160 | 0.52 | 10 | 0.80 | 2386 | 4970 | 0.83 | 10 | 5.6 | 3.1 | 101 |
| Ex. 5 | 2040 | 144 | 0.51 | 10 | 0.80 | 1960 | 4460 | 0.82 | 11 | 5.3 | 3.7 | 89 |
| Ex. 6 | 2375 | 143 | 0.52 | 10 | 0.87 | 2380 | 4210 | 0.84 | 11 | 5.8 | 4.0 | 92 |
| Ex. 7 | 2299 | 147 | 0.52 | 11 | 0.88 | 2266 | 4700 | 0.85 | 11 | 5.8 | 4.0 | 94 |
| Ex. 8 | 2301 | 157 | 0.52 | 10 | 0.85 | 2255 | 5700 | 0.85 | 13 | 5.7 | 4.2 | 95 |
| Ex. 9 | 2252 | 151 | 0.52 | 10 | 0.86 | 2212 | 4910 | 0.86 | 11 | 5.7 | 4.1 | 94 |
| Ex. 10 | 2249 | 143 | 0.53 | 12 | 0.99 | 2222 | 4310 | 0.84 | 13 | 6.3 | 4.2 | 83 |
| Ex. 11 | 2105 | 157 | 0.51 | 10 | 1.00 | 2105 | 5400 | 0.86 | 14 | 7.9 | 4.5 | 86 |
| Ex. 12 | 2105 | 158 | 0.51 | 11 | 0.93 | 2086 | 5650 | 0.82 | 13 | 7.4 | 4.4 | 88 |
| Ex. 13 | 2100 | 155 | 0.51 | 15 | 0.90 | 2099 | 5315 | 0.82 | 15 | 7.7 | 4.2 | 87 |
| Ex. 14 | 2420 | 155 | 0.52 | 10 | 0.94 | 2386 | 4970 | 0.85 | 11 | 7.6 | 4.5 | 95 |
| Ex. 15 | 2500 | 155 | 0.53 | 14 | 1.15 | 2512 | 5240 | 0.85 | 15 | 7.4 | 4.1 | 79 |
| Ex. 16 | 2030 | 170 | 0.52 | 11 | 1.00 | 2113 | 6200 | 0.84 | 12 | 8.5 | 4.4 | 99 |
| Ex. 17 | 2710 | 165 | 0.52 | 10 | 1.03 | 2731 | 6010 | 0.83 | 10 | 9.7 | 4.5 | 95 |
| Ex. 18 | 2300 | 151 | 0.51 | 14 | 1.16 | 2305 | 5500 | 0.82 | 15 | 7.6 | 4.7 | 81 |
| Ex. 19 | 2220 | 182 | 0.51 | 8 | 0.93 | 2086 | 6910 | 0.82 | 9 | 9.4 | 4.4 | 83 |
| Ex. 20 | 2420 | 165 | 0.52 | 9 | 1.00 | 2386 | 6070 | 0.85 | 8 | 8.4 | 4.1 | 85 |
| Comp. Ex. 1 | 1800 | 108 | 0.49 | 21 | 0.60 | 1800 | 2010 | 0.79 | 22 | 1.5 | 0.7 | 110 |
| Comp. Ex. 2 | 1430 | 140 | 0.51 | 13 | 0.70 | 1430 | 4010 | 0.78 | 14 | 2 | 2.1 | 106 |
| Comp. Ex. 3 | 1110 | 150 | 0.43 | 21 | 0.68 | 1150 | 4800 | 0.77 | 21 | 2.4 | 1.3 | 140 |
| Comp. Ex. 4 | 1710 | 126 | 0.50 | 11 | 0.69 | 1730 | 3000 | 0.76 | 11 | 1.4 | 0.7 | 205 |

From the results shown in Tables 1 to 2 above, the ferromagnetic powder consisting of flat acicular fine particles according to the present invention maintains favorable acicular shape and exhibits high saturation magnetization and coercive force. Accordingly, when compared with a conventional powder, it enables a magnetic layer of a magnetic recording medium having excellent properties suitable for high density recording.

As explained in detail above, the present invention provides a ferromagnetic powder consisting of fine particles maintaining a flat acicular figure, thereby capable of high saturation magnetization and a high coercive force. Thus, by using the ferromagnetic powder, a coating type magnetic recording medium suitable for high density recording can be obtained.

What is claimed is:

1. A ferromagnetic powder containing iron as the main component and containing more than 5 to 50 at. % Co, 0.1 to 30 at. % Al, 0.1 to 10 at. % of a rare earth element inclusive of Y, 0.05% by weight or less of an element belonging to Group 1a of the Periodic Table, and 0.1% by weight or less (inclusive of 0% by weight) of an element belonging to Group 2A of the Periodic Table, said powder comprising flat acicular particles having a mean major axis length of 0.01 to 0.40 μm and a crystallite diameter as determined by X-ray diffraction (Dx) of 50 to 250 angstroms, provided that the cross section diameter in the minor axis direction cut perpendicular to the major axis has a larger width and a smaller width, and that a cross section ratio in the minor axis direction, which is a larger width to smaller width ratio, is uniformly in the major axis direction greater than 1, and said powder yielding a $\sigma_s$/Dx ratio of 0.7 or higher, wherein, $\sigma_s$ represents the saturation magnetization and Dx represents the crystallite size determined by X-ray diffraction.

2. A ferromagnetic powder as claimed in claim 1, wherein the cross section ratio in the minor axis direction is 1.5 or higher.

3. A ferromagnetic powder as claimed in claim 1, wherein the amount of $H_2O$ released at 100° C. is 2% by weight or less, and the amount of $H_2O$ released at 300° C. is 4% by weight or less.

4. A ferromagnetic powder as claimed in one of claim 1, wherein the true density thereof is 5.55 g/cm³ or higher and the specific surface area as determined by BET method is in a range of from 30 to 70 m²/g.

5. A ferromagnetic powder as claimed in one of claim 1, wherein the powder yields a saturation magnetization ($\sigma_s$) in a range of from 100 to 200 emu/g and a coercive force in a range of from 1,200 to 3,000 Oe.

6. A ferromagnetic powder as claimed in claim 1, wherein the decrease in saturation magnetization ($\sigma_s$) when left under an atmosphere having a relative humidity of 90% at 60° C. for one week is 15% or lower.

* * * * *